(12) United States Patent
Megginson (10) Patent No.: US 8,595,380 B2
(45) Date of Patent: *Nov. 26, 2013

(54) MESSAGE BUS BASED REPLICATION

(75) Inventor: Rich Megginson, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 1015 days.

This patent is subject to a terminal disclaimer.

(21) Appl. No.: 12/638,710

(22) Filed: Dec. 15, 2009

(65) Prior Publication Data

US 2011/0145320 A1 Jun. 16, 2011

(51) Int. Cl.
*G06F 15/16* (2006.01)
*G06F 17/00* (2006.01)

(52) U.S. Cl.
USPC .......................................... 709/246; 707/622

(58) Field of Classification Search
USPC .................. 707/609, 610, 622, 640; 709/246
See application file for complete search history.

(56) References Cited

U.S. PATENT DOCUMENTS

| | | | |
|---|---|---|---|
| 6,247,017 B1 | 6/2001 | Martin | |
| 7,139,973 B1 | 11/2006 | Kirkwood et al. | |
| 7,203,687 B2 | 4/2007 | Adiba et al. | |
| 7,284,043 B2 * | 10/2007 | Feinleib et al. | 709/220 |
| 7,668,902 B2 * | 2/2010 | Harjanto | 709/203 |
| 7,788,224 B2 | 8/2010 | Fleck et al. | |
| 8,037,023 B2 | 10/2011 | Liu et al. | |
| 2010/0088187 A1 | 4/2010 | Courtney et al. | |
| 2011/0125823 A1 | 5/2011 | Macken | |
| 2011/0145320 A1 | 6/2011 | Megginson | |
| 2011/0153563 A1 | 6/2011 | Fitterer et al. | |
| 2011/0161929 A1 | 6/2011 | Keating | |

OTHER PUBLICATIONS

USPTO Notice of Allowance and Fees Due for U.S. Appl. No. 12/814,671 mailed Jun. 22, 2012.
USPTO Notice of Allowance and Fees Due for U.S. Appl. No. 12/814,671 mailed Feb. 22, 2012.
USPTO Office Action for U.S. Appl. No. 12/814,678 mailed Apr. 18, 2012.
Carstoiu et al., "A new grid caching system based on AMPQ protocol", 2008, IADIS International Conference WWW/Internet, all pages.

* cited by examiner

*Primary Examiner* — Aaron Strange
(74) *Attorney, Agent, or Firm* — Lowenstein Sandler LLP (57) ABSTRACT

An update publishing system receives update data representing an update made to a lightweight directory access protocol (LDAP)-based database. The publishing system identifies a list corresponding to the update data, converts the data into a wire level data format, and sends the converted data to an advanced message queuing protocol (AMQP) exchange corresponding to the list. The exchange enables a client not able to process update data in LDAP data format to receive data in a format that is compatible with the client. An update subscribing system subscribes to an AMQP messaging system for updates made to the LDAP-based database. The subscribing system receives update data from the messaging system, where the update data is in the different data format, identifies an entry identifier in the update data, and replaces an entry in a second database that has a matching entry identifier with an entry in the update data.

13 Claims, 4 Drawing Sheets

MESSAGE BUS BASED REPLICATION

TECHNICAL FIELD

Embodiments of the present invention relate to data replication. Specifically, the embodiments of the present invention relate to a method and system for replicating data using a message bus.

BACKGROUND

Many enterprises have implemented a directory service to store and manage enterprise data, such as user data, user account data, group data, etc. The directory service can be hosted by a directory server and can store the enterprise data using a directory for all of the information in a single, network-accessible repository. The directory can be a directory that uses a lightweight directory access protocol (LDAP). The enterprise data may be used by client applications, such as email applications or authentication applications. For example, a user may log in to an operating system and an authentication application may verify the authentication data against data that is stored by the LDAP-based directory service.

Enterprise data can continuously change. For example, user data may be updated with a new email address or telephone number for a user. The directory server can receive the updates and change the enterprise data accordingly. Client applications may need to receive the updates as well to ensure that the client application data accurately reflects the updates made to the LDAP-based data managed by the directory server. Not all client applications, however, may use the lightweight directory access protocol and may not have a mechanism to receive and process the updates from an LDAP-based directory server. Client applications, other than LDAP-based clients, have no means to obtain the updates made to the LDAP-based data in a format that is compatible with the client.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for replicating database updates using a message bus. A message bus based replication system manages database updates in a first data format and uses a message bus to enable clients to receive the database updates in a format that is compatible with the client. A message bus based replication system can comprise an update publishing system and an update subscribing system. An update publishing system receives update data representing an update made to a lightweight directory access protocol (LDAP)-based database, where the update data is in an LDAP data format. The update publishing system identifies a list corresponding to the update data and converts the update data into a wire level data format. The update publishing system sends the converted update data to an advanced message queuing protocol (AMQP) exchange corresponding to the list. The exchange enables a client that is unable to process update data in the LDAP data format to receive data representing the update in a format that is compatible with the client. An update subscribing system subscribes to an AMQP messaging system for updates made to a first database, where the first database is a LDAP-based database storing data in an LDAP data format. A client computing system processes data in a different data format. The update subscribing system receives update data from the messaging system, where the update data is in the different data format. The update subscribing system identifies an entry identifier in the update data and replaces an entry in a second database that has a matching entry identifier with an entry in the update data.

Embodiments of the present invention enable client applications, other than lightweight data access protocol (LDAP) based clients, to obtain updates made to an LDAP-based directory server for replicating the changes made to directory server. Non-LDAP clients can receive updates in a format that is compatible with the client. Embodiments of the present invention can replicate data to non-LDAP clients using a message bus, as such an advanced message queuing protocol (AMQP) message bus.

Figure 1:
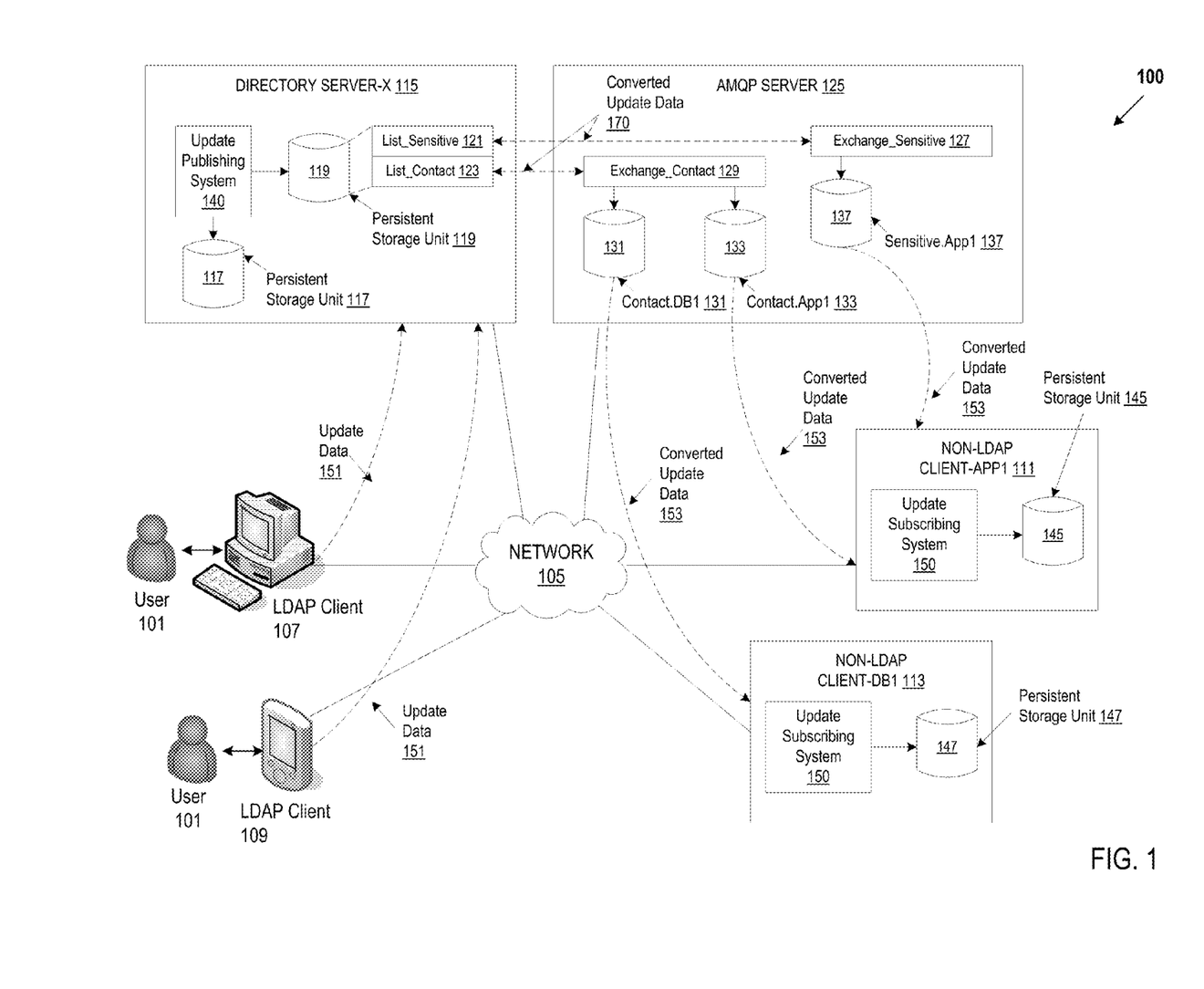
FIG. 1 illustrates an exemplary network architecture in which embodiments of the present invention may operate.

FIG. 1 illustrates an exemplary network architecture 100 on which embodiments of the present invention can be implemented. The network architecture 100 can include one or more directory servers 115 hosting a directory service to store data. A directory server-X 115 can store enterprise data, such as user data, user account data, group data etc. The directory server-X 115 can store the enterprise data using a directory that stores all of the information in a single, network-accessible repository. The directory can be a directory that uses a lightweight directory access protocol (LDAP). However, it is expressly contemplated that any appropriate directory and directory service can be enhanced for use in accordance with the replication architecture described herein. The directory server-X 115 can store the enterprise data in a persistent storage unit 117. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

The enterprise data may be used by client applications on clients 107-113, such as email applications or authentication applications, over a network 105. For example, a user 101 may log in to an operating system and an authentication application may verify the authentication data against data that is stored by the LDAP-based directory server-X 115. In another example, an email application may maintain an address book based on the data that is stored by the LDAP-based directory server-X 115. Clients can include LDAP-based clients 107,109 and non-LDAP based client 111,113. Non-LDAP based clients can be clients that are using a protocol not compatible with receiving and processing LDAP data.

The enterprise data can continuously change. For example, a user 101 may update user data with a new email address or telephone number. The directory server-X 115 can receive the data update 151 and update the enterprise data in persistent storage unit 117 accordingly. Client applications 107,109, including non-LDAP client applications 111,113 may need to receive the update to ensure that the client application data accurately reflects the update made to LDAP-based data managed by the directory server-X 115. For example, a client email application that maintains an address book based on the data that is stored by the LDAP-based directory server-X 115 may need the update to ensure that the address book contains the updated data.

The directory server-X 115 can include an update publishing system 140 for sending directory update data to clients, including clients that are not compatible with the protocol being used by the directory server-X 115 (e.g., non-LDAP clients 111,113). A client 111,113 can include an update subscribing system 150 for receiving directory update data in a format that is compatible with the client 111,113.

The update publishing system 140 can maintain and store lists 121,123 in a persistent storage unit 119 for determining which update data to send to which clients. Each list 121,123 can have a different type of data and the update publishing system 140 can control client access to the data using a list 121,123. For example, list_sensitive 121 may pertain to sensitive data, such as social security numbers, date of birth information, etc. The update publishing system 140 may grant access to list_sensitive 121 only to certain clients. The update publishing system 140 can also use lists 121,123 to enable clients 111,113 to receive update data by data type. For example, a client application 111 may only need to receive update data pertaining to contact information changes, such as changes to a name, an email address, or a telephone number. The update publishing system 140 can create a list, for example list_contact 123, for name changes, email address changes, and telephone number changes.

The update publishing system 140 can use a message bus for sending directory update data to clients that are not compatible with the protocol being used by the directory server-X 115. The network architecture 100 can include a messaging system that can include an advanced message queuing protocol (AMQP) server 125. In one embodiment, the AMQP server 125 resides on a separate machine from a directory server-X 115. In another embodiment, the messaging server and directory service may be hosted by the same machine. AMQP is an open Internet Protocol for messaging. AMQP enables complete interoperability for messaging middleware and defines both a wire level protocol for messaging (the transport layer) and higher level semantics for messaging (the functional layer). AMQP can be used in a publish-subscribe model to have multiple directory servers 115 supply updates to many consumers (e.g., clients 107-113).

The update publishing system 140 can receive update data 151 in LDAP format from clients, such as clients 107,109, and can identify a list that corresponds to the update data. For example, LDAP database 117 may store a telephone number of (555) 555-1234 for Joe Smith. A user 101, may change the telephone number of Joe Smith to (555) 555-5678. The update publishing system 140 can receive update data 151 pertaining to this change and can identify that the list_contact 123 corresponds to the update data. The update data can include an entry identifier, a list of object classes for the entry, and data that represents an entire database entry.

The update publishing system 140 can convert the update data into a wire level data format to send to an AMQP exchange. AMQP is a wire level protocol and can receive data in a wire level data format. Examples of wire level data formats can include and are not limited to a Qpid data format, directory services markup language (DSML) format, and LDAP data interchange format (LDIF). Qpid is an open source messaging implementation built on AMQP sponsored by the Apache Software Foundation. The Qpid application interface defines a data format, which client applications that have access to Qpid libraries can process. DSML is a data format that provides a means for representing directory structural information as an extensible markup language (XML) document. DSML provides a method for expressing directory queries and updates as XML documents. The LDIF data format is a wire level data format suitable for describing directory information or modifications made to directory information. The LDIF data format is typically used to import and export directory information between LDAP-based directory servers, or to describe a set of changes which are to be applied to a directory. However, it is expressly contemplated that any appropriate wire level data format can be used in accordance with the replication architecture described herein.

In one embodiment, the update publishing system 140 selects one of the wire level data formats and converts the update data into the selected wire level data format. For example, the update publishing system 140 may convert the update data into the Qpid data format, and send the converted update data 170 to the AMQP server 125. Non-LDAP based clients 111,113 that may be capable of processing the selected wire level data format (e.g., Qpid) may subscribe to the corresponding exchange 127,129 and obtain the updates converted to the selected wire level data format. In another embodiment, the update publishing system 140 may convert the update data into more than one wire level data format and send the update data that is converted to multiple wire level data formats to the AMQP server 125. For example, the update publishing system 140 can convert the update data into the Qpid data format, DSML, and LDIF and send the data that is converted in Qpid, DSML, and LDIF to the AMQP server 125.

The update publishing system 140 can send the converted update data 170 to an exchange on the AMQP server 125 that corresponds to a list. The AMQP specification includes modular components and standard rules for connecting the components. The three AMQP components include an exchange, a queue, and bindings. An exchange receives data from the update publishing system 140 and routes the data to queues, based on properties of the data or the content of the data. A queue stores the converted update data 170 until the converted update data 170 can be obtained by a client (e.g., clients 111,113). The bindings define the relationship between a queue and an exchange and provides the routing criteria.

The converted update data 170 sent by the update publishing system 140 to an exchange can include an entry identifier, a list of object classes for the entry, and data that represents an entire database entry (an entry that includes changed and un-changed attributes). For example, a database entry may include three attributes: a name, a telephone number, and an email address. Even if only the telephone number attribute has change for an entry, the update publishing system 140 can send the entire entry (e.g., the unchanged name, the changed telephone number, and the unchanged email address) to the corresponding exchange. For deleted entries, the update publishing system 140 can send the entry identifier with an empty attribute list to the corresponding exchange.

The AMQP server 125 can create an exchange 127,129 for each list 121,123. For example, the AMQP server 125 can include an exchange_sensitive 127 that corresponds to list_sensitive 121 and an exchange_contact 129 that corresponds to list_contact 123. The update publishing system 140 may convert the update data for sensitive data (e.g., social security numbers) into the Qpid data format, and send the converted update data 170 to the exchange_sensitive 127. Non-LDAP based clients 111,113 that may be capable of processing the Qpid data format may subscribe to the exchange_sensitive 127 and obtain the updates converted to the Qpid data format. In another embodiment, the update publishing system 140 may maintain separate lists for each data format, such as a list_sensitive_Qpid (not shown) and a list_sensitive_DSML (not shown). The update publishing system 140 may convert the update data for sensitive data into Qpid and DSML data formats. The update publishing system 140 can send the update data 170 that is converted to the Qpid data format to the exchange_sensitive_Qpid on the AMQP server 125. Non-LDAP based clients 111,113 that may be capable of processing the Qpid data format may subscribe to the exchange_sensitive_Qpid and obtain the updates converted to the Qpid data format. The update publishing system 140 can send the update data 170 that is converted to the DSML data format to the exchange_sensitive_DSML on the AMQP server 125. Non-LDAP based clients 111,113 that may be capable of processing the DSML data format may subscribe to the exchange_sensitive_DSML and obtain the updates converted to the DSML data format. An exchange can be a 'topic' or 'match' type of exchange for routing messages to queue based on pattern. For example, the exchange_contact 129 can automatically route update data to all queues that match the pattern "contact.<client id>," (e.g., contact.dbl 131 queue and contact.appl 133 queue).

The AMQP server 125 can include a queue for each client subscribing to an exchange. A client can subscribe to an exchange by data type and/or by access type. For example, non-LDAP client-Appl 111 may subscribe to two exchanges, exchange_sensitive 127 and exchange_contact 129, and the AMQP server 125 can create a queue for the client for each exchange (e.g., sensitive.appl queue 137 and contact.appl queue 133). Another non-LDAP client-DBl 113 may not have access to the exchange for sensitive data and may subscribe only to exchange_contact 129 and the AMQP server 125 can create a queue for the client for the one exchange (e.g., contact.dbl queue 131).

A queue 131-137 can store the converted update data 170 until the converted update data can be obtained by a subscribing client application. A queue 131-137 can be a first-in-first-out (FIFO) queue. For example, a publishing system 140 can push new update data to the beginning of a list (e.g., list_sensitive 121), and a client application 111,113 can obtain older update data from the end the list. A queue 131-137 can also be a last value queue (LVQ), such that a client 111,113 that may be slow in processing update data can avoid storing duplicate entries in the queue.

For example, there may be an entry E which has an attribute A, such as an entry for Joe Smith having a phone number of (555) 555-1234. A user 101, may change the telephone number of Joe Smith to (555) 555-5678. Entry E may be associated with list_contact 123. The directory server-X 115 may receive two operations, to change attribute A, such as (555) 555-1234, to attribute B, (555) 555-5678, in entry E. The directory server-X 115 may receive a delete of attribute A followed by an add of the attribute B for entry E. The directory server-X 115 can cause update data representing these events to be sent to the queues, contact.appl 137 and contact.dbl 131. The update data can include an entry E without attribute A followed by an entry E that includes attribute B. Some time later, the directory server-X 115 may replicate these changes to directory server-Y (not shown). The directory server-Y may also send update data reflecting the same sequence of updates to the queues, contact.appl 137 and contact.dbl 131. Client-appl 111 and client-dbl 113 may see the state of entry E temporarily regress to the "E without A" state as a result of the update data from directory server-Y.

With LVQ, the AMQP server 125 can replace duplicates that may still be unread in a queue with the latest state. In the example above, if the client-appl 111 has not yet read the original sequence of operations from directory server-X 115 when the directory server-Y causes update data to be sent to the queue, the state changes of entry E written by the directory server-X 115 can be replaced with those from the directory server-Y. A client, thus, can avoid receiving duplicate entries from a queue.

The AMQP server 125 can store the converted update data 170 in a queue 131,133,137. In another embodiment, a network device, such as a gateway (not shown) can be coupled between the AMQP server 125 and a client 111,113. The gateway can obtain converted update data 170 from a queue 131,133,137 and further convert the converted update data 170 to another wire level data format for a client application 111,113. For example, queue 131 may store update data for contact information in the Qpid data format. A gateway can obtain the Qpid update data and further convert the data to DSML format for non-LDAP client 113.

A client 111,113 can include an update subscribing system 150 to receive directory update data in a format that is compatible with the client. The update subscribing system 150 can determine the exchanges that are available to a client and receive user input of the selection of exchanges to subscribe to. The update subscribing system 150 can obtain the converted update data 153 from the messaging system. For example, the update subscribing system 150 may obtain the converted update data 153 from the AMQP server 125 or from a network device, such as a gateway.

The client 111,113 can also include a persistent storage unit 145,147 for storing data that reflects the data being managed by the directory server-X 115. For example, the client 111 may store an address book database in the persistent storage unit 145. The address book database may contain an entry for Joe Smith with a telephone number and email address. The update subscribing system 150 can identify an entry identifier in the converted update data and search the address book database for a matching entry identifier. The update subscribing system 150 can replace the entry in the address book database having the matching identifier with the entry in the converted update data 153 to replicate the changes made to directory server-X 115. For example, the converted update data may include an entry for Joe Smith having a different telephone number (or an additional telephone number), and the same email address. The update subscribing system 150 can replace the entry in the address book with the entry in the converted update data to replicate the changes made to directory server-X 115.

A directory server-X 115 and AMQP server 125 can be any type of computing device including server computers, desktop computers, laptop computers, hand-held computers, or similar computing device. A client 107-113 can be a smart hand-held device or any type of computing device including desktop computers, laptop computers, mobile communications devices, cell phones, smart phones, hand-held computers or similar computing device capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

The update publishing system 140 and update subscribing system 150 can be implemented as hardware, computer-implemented software, firmware or a combination thereof. In one embodiment, the update publishing system 140 and update subscribing system 150 comprises instructions stored in memory 404 that cause a processing device 402 in FIG. 4 described in greater detail below to perform the functions of the update publishing system 140 and update subscribing system 150.

Figure 2:
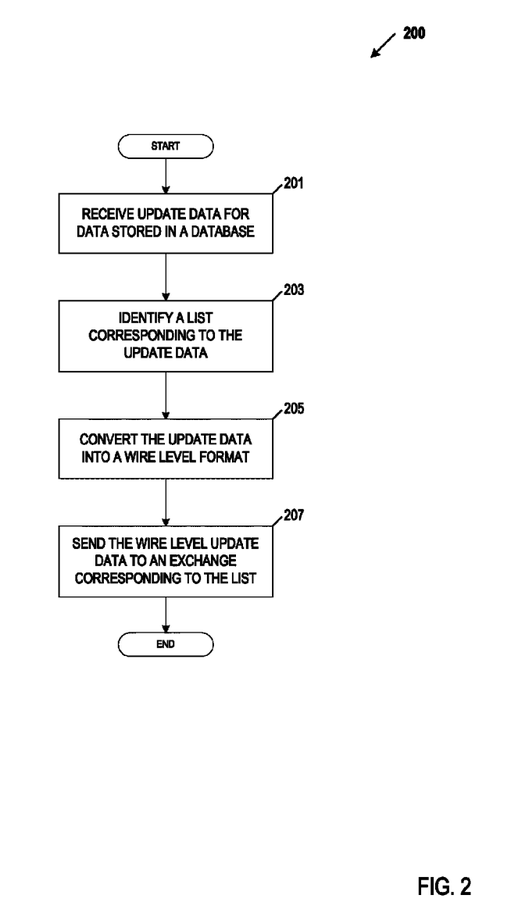
FIG. 2 is a flow diagram which illustrates an embodiment of a method for sending updated database data using a message bus.

FIG. 2 is a flow diagram which illustrates an embodiment of a method 200 for sending updated database data using a message bus. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the update publishing system 140 in a directory server 115 of FIG. 1.

The update publishing system can store and maintain enterprise data using a directory, such as an LDAP-based directory. The data may be stored in a database. The enterprise data can include user data, user account data, group data etc. The update publishing system can store and maintain lists in a persistent storage unit for determining which update data to send to which clients. Each list can have a different type of data and the update publishing system can control client access to the data using the list. For example, 'list_sensitive' may pertain to sensitive data, such as social security numbers, date of birth information, etc., and the update publishing system may grant access to 'list_sensitive' only to certain clients. A list may pertain to data in a particular wire level data format. For example, 'list_sensitive' may pertain to sensitive data in a Qpid data format. There may be another list, such as 'list_sensitive_DSML' that pertains to sensitive data in a DSML data format.

At block 201, the update publishing system can receive update data for data stored in the LDAP-based database. The update data may be in LDAP format. For example, the LDAP database may store a telephone number of (555) 555-1234 for Joe Smith. A user may change the telephone number of Joe Smith to (555) 555-5678. The update publishing system can receive update data reflecting this change in LDAP format at block 201.

At block 203, the update publishing system can identify a list that corresponds to the update data. For example, the update publishing system may identify that the update data pertaining to the change to the telephone number of Joe Smith corresponds to 'list_contact.' At block 205, the update publishing system can convert the update data into a wire level data format, such as a Qpid data format, DSML data format, or LDIF, to send to an AMQP exchange. AMQP is a wire level protocol and can receive data in a wire level data format. However, it is expressly contemplated that any appropriate wire level data format can be used in accordance with the replication architecture described herein.

At block 207, the update publishing system can send the converted data (e.g., wire level update data) to an exchange that corresponds to the list and the method ends. The exchange can be an AMQP exchange which may be hosted on an AMQP server. The converted update data (e.g., wire level update data) can include an entry identifier, a list of object classes for the entry, and data that represents an entire database entry (an entry that includes changed and un-changed attributes). For example, a database entry may include three attributes: a name, a telephone number, and an email address. The update publishing system can send can send update data that includes all of the attributes even if only the telephone number attribute has change. For deleted entries, the update publishing system can send an entry identifier with an empty attribute list to the corresponding exchange. Subsequently, a client, such as a non-LDAP client, that subscribes to the exchange can obtain update data in a format that is compatible with the client.

Figure 3:
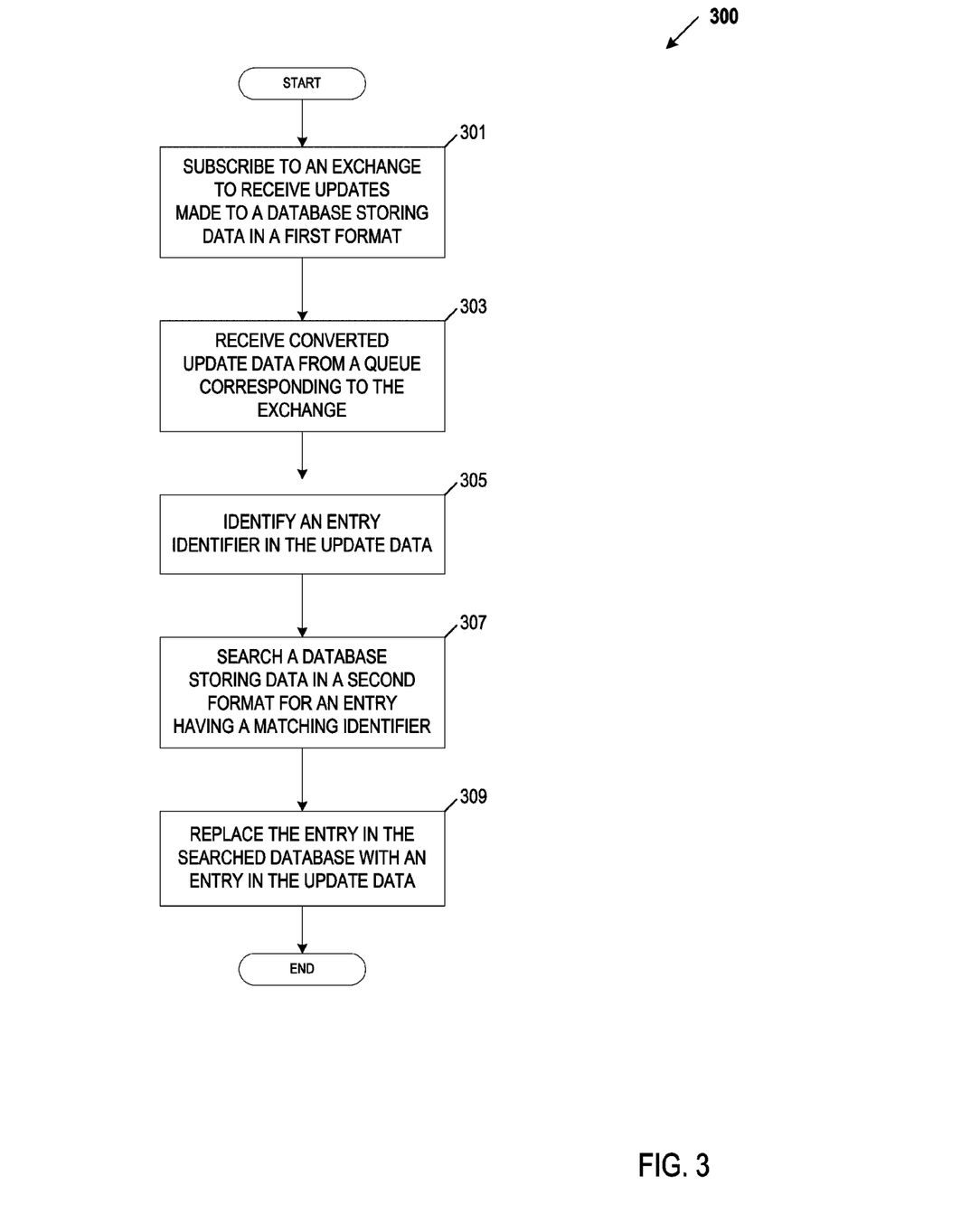
FIG. 3 is a flow diagram which illustrates an embodiment of a method for obtaining updated database data using a message bus.

FIG. 3 is a flow diagram which illustrates an embodiment of a method 300 for obtaining updated database data using a message bus. Method 300 can be performed by processing logic that can comprise hardware (e.g., circuitry, dedicated logic, programmable logic, microcode, etc.), software (e.g., instructions run on a processing device), or a combination thereof. In one embodiment, method 200 is performed by the update subscribing system 150 in a directory server 115 of FIG. 1.

The update subscribing system can store and maintain data in a persistent storage unit that reflects the data being managed by an LDAP-based directory server. For example, an LDAP-based directory server may maintain contact information for enterprise users and may receive update data to change the contact information. The update subscribing system may store an address book in a database that may be based on the contact information maintained by the LDAP-based server. The update subscribing system may request updates of any changes made to the contact information maintained by the LDAP-based directory server to ensure that the address book database reflects the same changes.

At block 301, the update subscribing system can determine the exchanges that are available to a client for subscription and receive user input of the selection of exchanges for a client application to subscribe to. An AMQP server can provide the available exchanges to the update subscribing system. A user may select an exchange by data type and/or by access type. For example, a user may subscribe to an exchange, 'exchange_contacts,' to allow a client application to receive updates to contact information being managed by the LDAP-based directory server and to received the updates converted into a wire level data format that can be processed by a client. When the update subscribing system receives user input of the selection of exchanges to subscribe to, the update subscribing system can send the subscription information to the AMQP server. The AMQP server can create a queue for the client corresponding to the exchange. For example, the AMQP server can create a queue, 'contact.appl,' in response to the update subscribing system sending the selection to the AMQP server.

At block 303, the update subscribing system can receive update data that is converted into a data format that is compatible with the client. For example, the LDAP-based directory server may receive a change to an entry in the contact information database, such as a change to the telephone number for Joe Smith. The update subscribing system may not be compatible to receive update data in LDAP format and may receive update data that is converted to a data format that the update subscribing system can receive and process in order to change the entry for Joe Smith in the address book database. The format may be a wire level data format, such as a Qpid data format, DSML data format, and LDIF. The converted update data may be stored in a queue on the AMQP server at block 303, and the update subscribing system can receive the converted update data from the queue (e.g., queue contact.appl). In another embodiment, a network device, such as a gateway can obtain the converted update data from a queue and further convert the converted update data to another wire level data format, and the update subscribing system can receive the converted update data from a gateway.

At block 305, the update subscribing system can can identify an entry identifier in the converted update data and search the client data (e.g., address book database) for a matching entry identifier. At block 309, the update subscribing system can replace the entry in the database having the matching identifier with the entry in the converted update data to replicate the changes made to LDAP-based directory server and the method ends. The converted update data can include all of the attributes for an entry and the update subscribing system can replace the entire entry in the address book database. For example, the converted update data may include the name of Joe Smith, a different telephone number, and an unchanged email address. The update subscribing system can replace the entire entry (e.g., the name, the telephone number, and the email address) in the address book database with the entry in the converted update data even though only the telephone number has changed.

Figure 4:
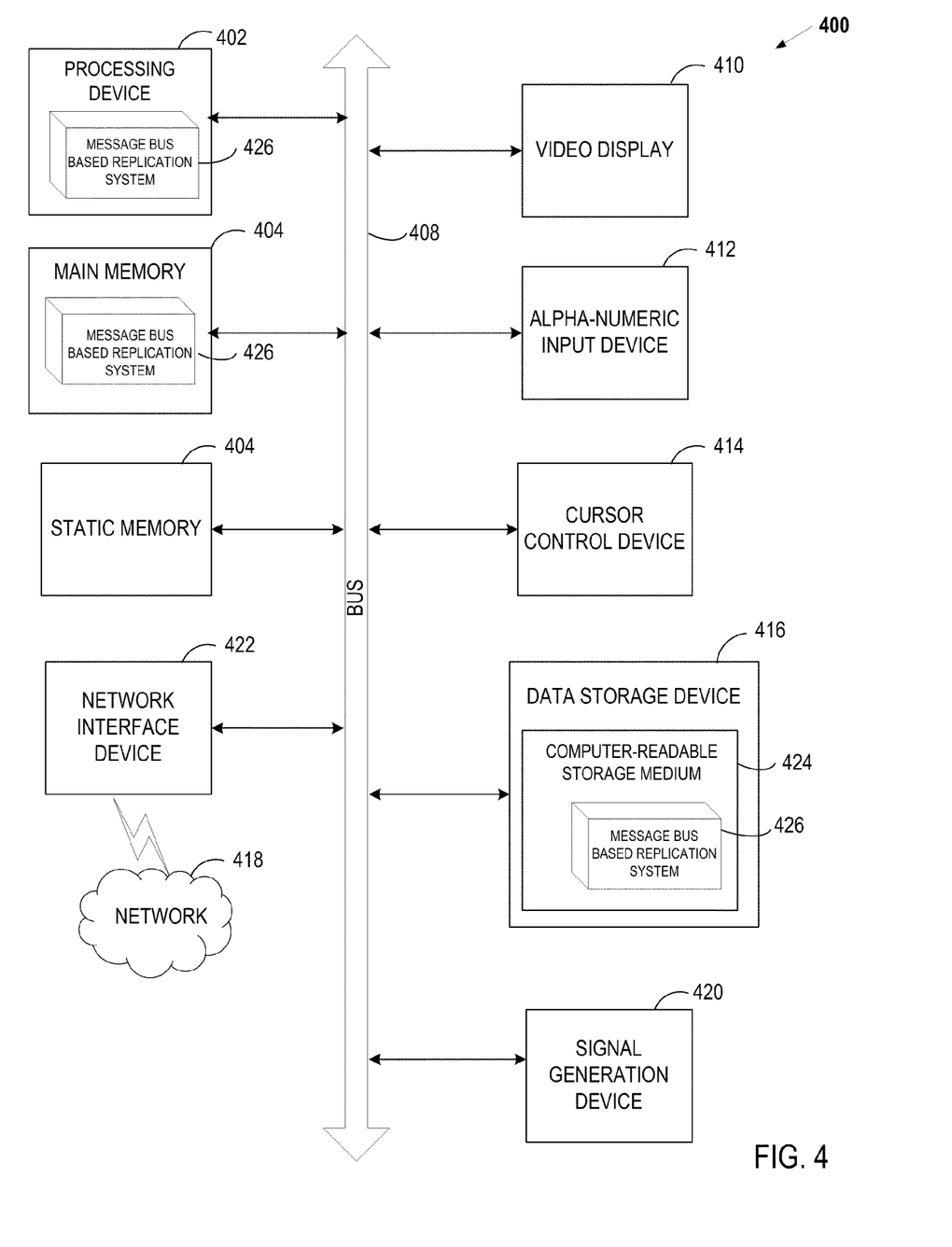
FIG. 4 is a diagram of one embodiment of the message bus based updating system.

FIG. 4 is a diagram of one embodiment of a computer system for replicating database updates using a message bus. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the message bus based updating system 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the message bus based updating system 426) embodying any one or more of the methodologies or functions described herein. The message bus based updating system 426 may also reside, completely or at least partially, within the main memory 404 and/or within the processing device 402 during execution thereof by the computer system 400, the main memory 404 and the processing device 402 also constituting machine-readable storage media. The a message bus based updating system 426 may further be transmitted or received over a network 418 via the network interface device 422.

The computer-readable storage medium 424 may also be used to store the message bus based updating system 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The message bus based updating system 426, components and other features described herein (for example in relation to FIG. 1) can be implemented as discrete hardware components or integrated in the functionality of hardware components such as ASICS, FPGAs, DSPs or similar devices. In addition, the message bus based updating system 426 can be implemented as firmware or functional circuitry within hardware devices. Further, the message bus based updating system 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "identifying," "converting," "sending," "subscribing," "replacing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for replicating database updates using a message bus. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving, by a server computing system, update data representing an update made to a lightweight directory access protocol (LDAP)-based database, wherein the update data is in a LDAP data format;
identifying, by the server computing system, a list corresponding to the update data;
converting, by the server computing system, the update data into a wire level data format; and
sending, by the server computing system, the converted update data to an advanced message queuing protocol (AMQP) exchange corresponding to the list, wherein the exchange enables a client that is unable to process the update data in the LDAP data format to receive data representing the update in a format that is compatible with the client.

2. The method of claim 1, wherein the server computing system is a LDAP-based directory server.

3. The method of claim 1, wherein converting the update data into the wire level data format comprises converting the update data into at least one of a Qpid data format, a directory services markup language format, or a LDAP data interchange format.

4. The method of claim 1, wherein the AMQP exchange is hosted by an AMQP server.

5. The method of claim 1, wherein sending the converted update data to the AMQP exchange comprises:
sending an entry comprising an entry identifier and attributes of the entry.

6. A system comprising:
a persistent storage unit to store a lightweight directory access protocol (LDAP)-based database and a plurality of lists for managing updates to the LDAP-based database, wherein each list corresponds to an advanced message queuing protocol (AMQP) exchange;
a LDAP-based directory server coupled to the persistent storage unit to receive update data representing an update made to the LDAP-based database, wherein the update data is in a LDAP data format; and
an update publishing system on the LDAP-based directory server to
identify a list corresponding to the update data, convert the update data into a wire level data format, and
send the converted update data to the AMQP exchange that corresponds to the identified list, wherein the AMQP exchange enables a client that is unable to process the update data in the LDAP data format to receive data representing the update in a format that is compatible with the client.

7. The system of claim 6, wherein the exchange is on an AMQP server.

8. The system of claim 6, wherein to convert the update data into a wire level data format comprises converting the update data into at least one of a Qpid data format, a directory services markup language format, or a LDAP data interchange format.

9. A non-transitory computer-readable storage medium including instructions that, when executed by a processing device, cause the processing device to perform a set of operations comprising:
receiving update data representing an update made to a lightweight directory access protocol (LDAP)-based database, wherein the update data is in a LDAP data format;
identifying a list corresponding to the update data;
converting the update data into a wire level data format; and
sending, by the processing device, the converted update data to an advanced message queuing protocol (AMQP) exchange corresponding to the list, wherein the exchange enables a client that is unable to process the update data in the LDAP data format to receive data representing the update in a format that is compatible with the client.

10. The non-transitory computer-readable storage medium of claim 9, wherein the server computing system is a LDAP-based directory server.

11. The non-transitory computer-readable storage medium of claim 9, wherein converting the update data into a wire level data format comprises converting the update data into at least one of a Qpid data format, a directory services markup language format, or a LDAP data interchange format.

12. The non-transitory computer-readable storage medium of claim 9, wherein the AMQP exchange is hosted by an AMQP server.

13. The non-transitory computer-readable storage medium of claim 9, wherein sending the converted update data to the AMQP exchange comprises:
   sending an entry comprising an entry identifier and 41 attributes of the entry.

* * * * *